United States Patent
Nam

[11] Patent Number: 5,210,684
[45] Date of Patent: May 11, 1993

[54] APPARATUS AND METHOD FOR CONTROLLING THE OPERATING FREQUENCY OF COMPRESSOR IN AIR CONDITIONING APPARATUS

[75] Inventor: Dong Y. Nam, Seoul, Rep. of Korea
[73] Assignee: Samsung Electronics Co., Ltd., Suweon, Rep. of Korea
[21] Appl. No.: 809,326
[22] Filed: Dec. 18, 1991

[30] Foreign Application Priority Data
Dec. 18, 1990 [KR] Rep. of Korea .................. 90-20913

[51] Int. Cl.$^5$ .......................... H02P 7/36; H02M 1/12
[52] U.S. Cl. ........................................ 363/37; 363/39; 363/95; 318/801; 318/805; 318/811
[58] Field of Search .................. 363/37, 39, 131, 132, 363/95–98; 318/800–803, 806–807, 811

[56] References Cited
U.S. PATENT DOCUMENTS
4,024,444 5/1977 Dewan et al. .................. 318/805
4,186,334 1/1980 Hirata .......................... 318/805

Primary Examiner—Emanuel T. Voeltz
Attorney, Agent, or Firm—Burns, Doane, Swecker & Mathis

[57] ABSTRACT

Line voltage of any two phases of a three phase AC power supply is detected through a high pass filter. The line voltage is amplified by an amplifier. A microprocessor receives the amplified line voltage via an input terminal. The microprocessor determines whether the line voltage is below a first set value, between the first set value and a second set value or above the second set value. When the line voltage is below the first set value, the compressor operates in the previous operation state. When the line voltage is between the first set value and the second set value, the compressor operates in the operation state 1 step lower than the previous speed. When the line voltage is above the second set value, the compressor operates in the lowest operation state. Whereby the noise and vibrations generated in the compressor are suppressed.

8 Claims, 6 Drawing Sheets

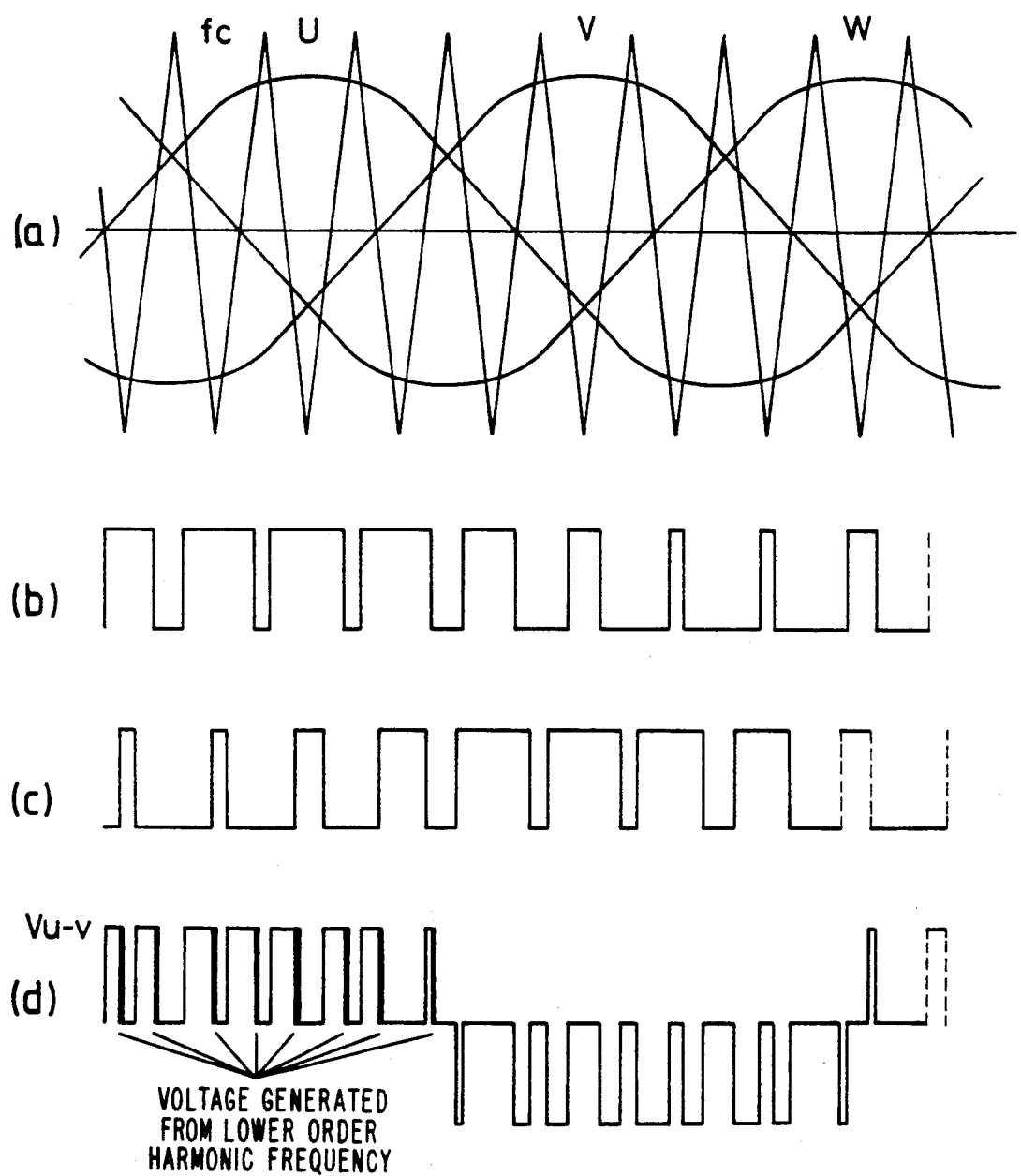

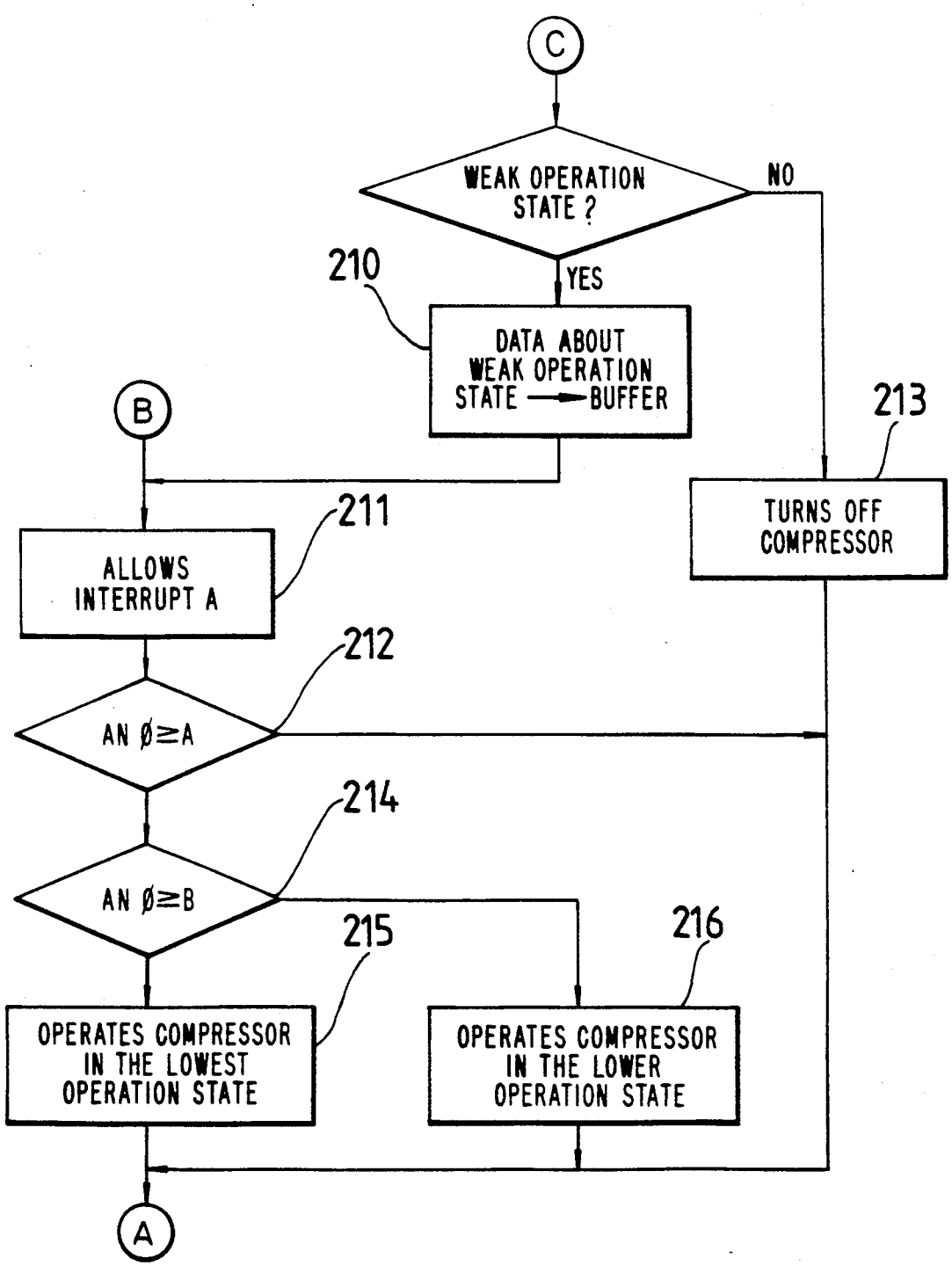

APPARATUS AND METHOD FOR CONTROLLING THE OPERATING FREQUENCY OF COMPRESSOR IN AIR CONDITIONING APPARATUS

BACKGROUND OF THE INVENTION

The present invention relates to an apparatus and method for controlling the frequency of operation of the compressor in an air conditioning apparatus and more particularly, to the prevention of noise and vibrations caused by lower order harmonic frequency from generating in driving the compressor by inverter.

In a divided air conditioning apparatus which includes an outdoor device and indoor device, a control portion in the outdoor device includes a compressor. A microprocessor of the indoor device receives data regarding the compressor operation frequency through a key board and sends the operation frequency data produced by processing the indoor temperature and various requirements to the indoor device. The microprocessor of the outdoor device outputs control signals to the inverter drive portion so as to produce a PWM (Pulse Width Modulation) wave. The PWM wave is applied to the inverter, and the inverter generates a three phase AC power and applies the three phase AC power to the compressor, to power the compressor in the operation state as intended by the user.

When the compressor is driven by the inverter as described above, a lower order harmonic frequency is generated due to a magnetic distortion of the motor core and switch time deviations of power transistors comprising the inverter. Accordingly, the conventional compressor has a disadvantage in that it generates noise and vibrations as a result of the lower order harmonic frequency.

A typical example of preventing noise and vibrations from being generated in the compressor is disclosed in U.S. Pat. No. 4,186,334 wherein, a phase controller controls the DC output voltage of a rectifier. A power factor detector detects a phase controlling signal which outputs from a voltage/current controller for controlling the phase controller. The output signal of the power factor detector is added to a speed reference signal through an adder and subtracter. The speed reference signal is inputted to a frequency controller and the voltage/current controller to prevent the output current of the frequency controller and the torque of the motor from oscillating at a low frequency.

However, the invention does not solve the problem in that noise and vibrations are generated in the lower order harmonic frequency.

SUMMARY OF THE INVENTION

It is the object of the present invention to provide an apparatus and method for suppressing noise and vibrations of a compressor caused by the lower order harmonic frequency by controlling the operation frequency of the compressor.

In order to achieve the object, the line voltage of any two phases of three phase AC power is detected through a high pass filter. The line voltage is amplified by an amplifier. A microprocessor receives the amplified line voltage via an input terminal. The microprocessor determines whether the line voltage is below the first set value, between the first set value or the second set value or above the second set value. When the line voltage is below the first set value, the compressor operates in the previous operation state. When the line voltage is between the first set value and the second set value, the compressor operates in an operation state 1 step lower than the previous speed. When the line voltage is above the second set value, the compressor operates in the lowest operation state.

THE BRIEF DESCRIPTION OF THE DRAWINGS

FIG. 2 is a PWM wave form diagram;

Figure 3A:
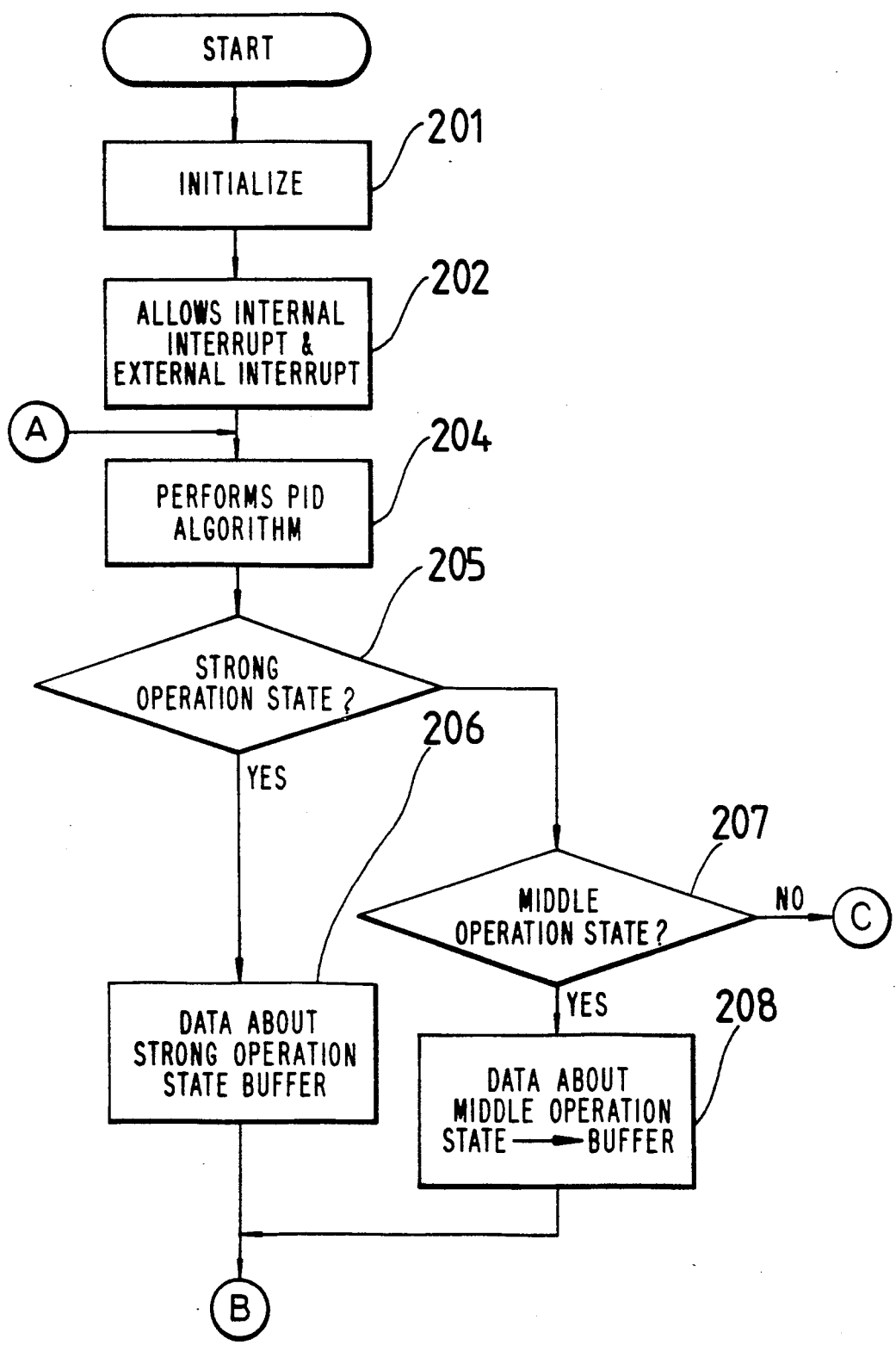
Figure 4:
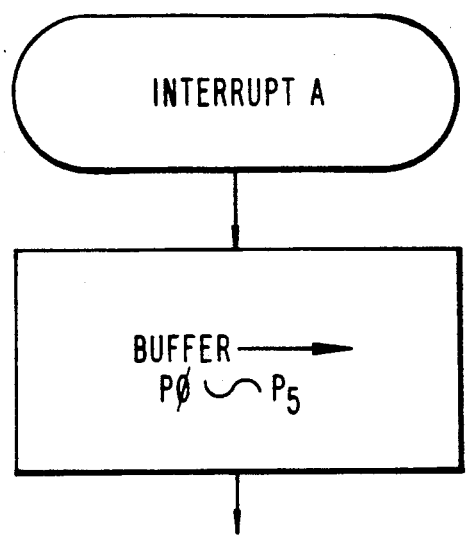
Figure 5:
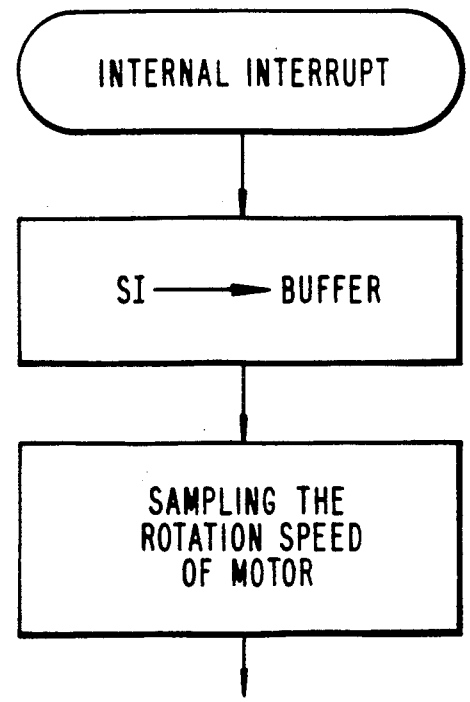
Figure 6:
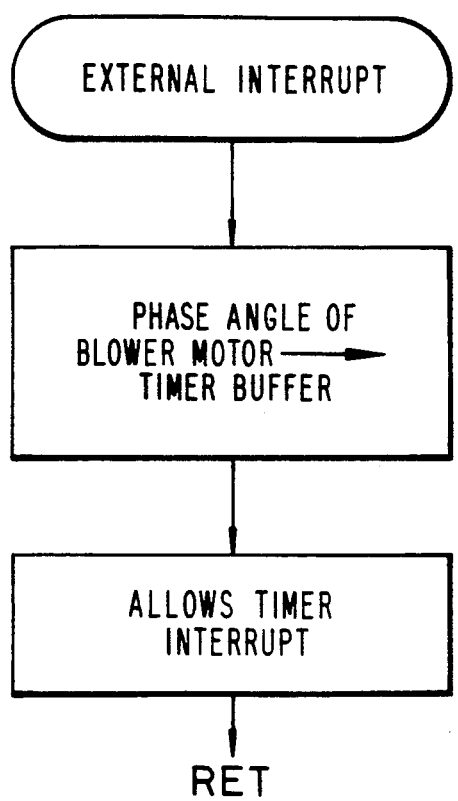

FIGS. 3 (a) and (b) are flow charts showing the method controlling the air conditioning apparatus according to the present invention;

FIG. 4 is a flow chart showing the interrupt A subroutine;

FIG. 5 is a flow chart showing the internal interrupt subroutine;

FIG. 6 is a flow chart showing the external interrupt subroutine; and

Figure 7:
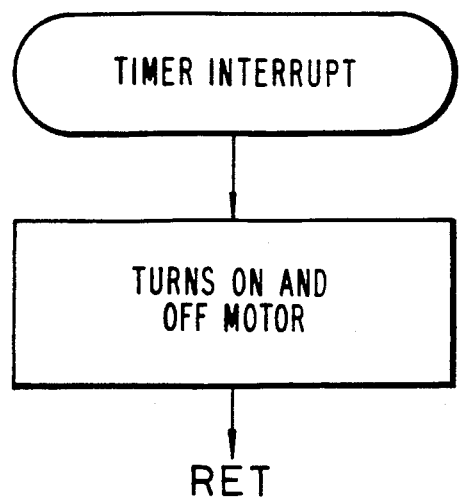

FIG. 7 is a flow chart showing the timer interrupt subroutine.

THE DETAILED DESCRIPTION OF THE INVENTION

Figure 1:
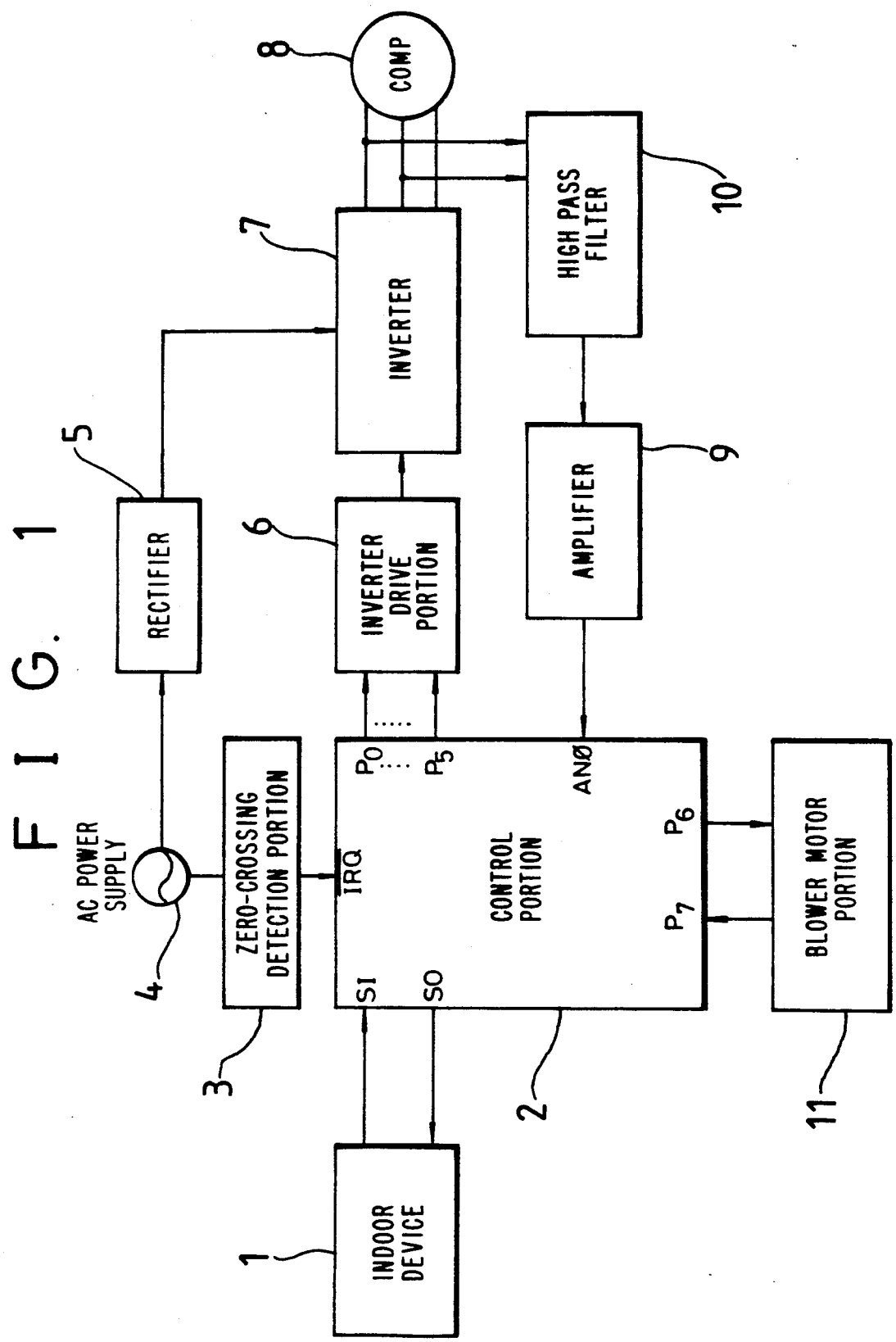
FIG. 1 is a block diagram showing the air conditioning apparatus of the present invention.

FIG. 1 is a block diagram showing the air conditioning apparatus of the present invention;

Considering the block diagram of FIG. 1, indoor device 1 receives the operation frequency which is input by the user via a key board (not shown). The key board sends data, according to the operation frequency, to the control portion 2 of the outdoor device. AC power supply 4 is connected to the rectifier 5. The rectified DC voltage is applied to the inverter 7. The control portion 2 outputs control signals to the inverter drive portion 6. The inverter drive portion 6 applies PWM wave to power transistors of the inverter 7. Three phase AC produced according to the PWM wave by the inverter 7 is applied to the compressor 8, so the compressor 8 operates in the operation frequency selected by user. High pass filter 10 is connected to any two phase of the three phase AC and detects the line voltage, so signals having a frequency over the predetermined frequency pass the high pass filter 10. The signals are amplified by an amplifier 9 and inputted to the control portion 2. Blower motor portion 11 controls the speed of the blower motor installed in the outdoor device according to the control signal from the control portion 2 and outputs speed data about the blow motor to the control portion. Zero-crossing detection portion 3 detects zero-crossing time of the AC power and applies an interrupt signal to the control portion 2 at zero-crossing time.

The operation of the air conditioning apparatus according to the present invention is described as follows:

With the power on to the indoor device 1 and the control portion 2 of outdoor device, the indoor device 1 receives the operation signal from keyboard (not shown). The indoor device 1 determines which one of the following operation states: strong operation state, middle operation state or weak operation state, is to receive the operation signal. The indoor device 1 sends the determined operation state to the control portion 2 through an interface portion (not shown).

The control portion 2 outputs the control signal to blower motor portion 11 through the output port P6 and also outputs the PWM wave data to the inverter drive portion 6 through output ports P0-P5. The inverter forms three phase AC according to the PWM wave which is outputted by the inverter drive portion 6. The three phase AC is applied to compressor 8 to activate the compressor 8.

The inverter 7 drives the compressor 8 in the operation frequency such as the three phase sinusoidal wave shown in (a) of FIG. 2. At this time, because the transistors of the inverter 7 have deviations of switching time, the three phase AC exhibits harmonic frequency. For example, (b) and (c) of FIG. 2 shows the PWM waves corresponding to two phases (for example, U and V) of the three phase AC outputted from the inverter 7. Accordingly, the line voltage detected from two phases of the three phase AC is shown as (d) of FIG. 2. Here, the fifth and seventh harmonic frequencies appears as the black painted part shown in (d) of FIG. 2. Therefore, when the black painted part is removed, we can prevent noise and vibrations of the compressor 8.

The process in which the fifth and seventh harmonic frequencies are removed is described as follows:

The high pass filter 10 is connected to any two phases of the three phase AC. The detected line voltage of the two phases has the fifth and seventh harmonic frequencies as shown (d) of FIG. 2. The low order harmonic frequencies are amplified by the amplifier 9. The amplified low order harmonic frequencies are inputted to an A/D converter (not shown) in the control portion 2 through the input terminal ANO. The control portion 2 determines the state of the inputted line voltage, i.e. below the first set value (for example, 30 mV), within the range from the first set value to the second set value (for example, 50 mV) or above the second set value. When the inputted line voltage is below the first set value, the compressor operates in the previous operation state. When the inputted line voltage is within the range from the first set value to the second set value, the compressor operates in the operation state which is decreased 1 step below the previous state. When the inputted line voltage is above the second set value, the compressor operates in the lowest operation state. Thus, the low order harmonic frequency is removed, so that noise and vibrations may be prevented.

FIGS. 3 (a) and (b) show the control process of the control portion of the outdoor device according to the present invention.

When the air conditioning apparatus according to the present invention is powered, initializing step clearing the various registers, input and output ports is performed in step 201. In step 202, external interrupt and internal interrupt are allowed. For example, the external interrupt is generated every time the zero-crossing time of the AC power supply occurs and the internal interrupt is generated at the rate of 8 times the carrier frequency. In step 204, temperature control quantity is calculated by the PID (proportional, integration and differentiation) algorithm. In step 205, it is inquired whether or not the operation command inputted from indoor device 1 is the strong operation state. When the answer is yes, data about the strong operation frequency is stored in buffer (step 206), and interrupt A is allowed (step 211). In step 205, when the answer is no, the control process progresses to step 207 in which it is inquired whether or not the operation command inputted from indoor device 1 is the middle operation state. In step 207, when the answer is yes, data about the middle operation frequency is stored in buffer (step 208), and interrupt A is allowed (step 211). In step 207, when the answer is no, the control process progresses to step 209 in which it is inquired whether or not the operation command inputted from indoor device 1 is the weak operation state. In step 209, when the answer is yes, data about the weak operation is stored in buffer (step 210), and interrupt A is allowed (step 211). In step 209, when the answer is no, the compressor is turned off (step 213), and the control process returns to step 204.

Next, in step 212, it is inquired whether or not the voltage inputted at input port ANO is above a first set value (for example, A=30 mV). In step 212, when the answer is no, the compressor 8 is driven in present operation frequency because the three phase AC applied to compressor 8 does not have the fifth and the seventh harmonic frequencies, and the control process returns to step 204. In step 212, when the answer is yes, the control process progresses to step 214 in which it is inquired whether or not the voltage inputted at input port ANO is above a second set voltage (for example, B=50 mV). In step 214, when the answer is no, the compressor operates in operation state which is decreased by 1 step, and the control process returns to step 204. In step 214, when the answer is yes, the compressor 8 operates in the lowest operation state, so the fifth and seventh harmonic frequencies are prevented.

FIG. 4 shows interrupt A subroutine. After interrupt A is allowed in step 211 shown in FIG. 3, it is generated according to the predetermined program, and the predetermined signals according to the operation frequency stored in the buffer is sent to the inverter 7 through output terminals PO-P5, so the inverter drive portion 6 shown in FIG. 1 generates PWM wave. Next, the control process returns to the address which the interrupt A generated.

FIG. 5 shows internal interrupt subroutine. After the internal interrupt is allowed in step 203, shown in FIG. 3, it is generated according to the predetermined program. When the internal interrupt is generated, data about operation frequency of the compressor 8 is received through input port SI of control portion 2 of outdoor device, and in the next step the control process returns after it performs sampling of the rotation speed of the blower motor. Next, the control process returns to the address which the internal interrupt generated.

FIG. 6 shows external interrupt subroutine. After external interrupt is allowed in step 203 shown in FIG. 3, the control portion 2 receives the interrupt every time the zero-crossing is generated in the AC power applied to the outdoor device. When the external interrupt is generated data about the phase angle of the outdoor blower fan is store in timer buffer. In the next step, the timer interrupt is allowed. In the next step, the control process returns to the address which the external interrupt generated.

FIG. 7 shows the timer interrupt subroutine. After the timer interrupt is allowed, as shown in FIG. 6, it generated according to the predetermined program. When the timer interrupt is generated, the blower motor of blower motor portion 11 is turned on and off according to blower motor control data determined in step 215 and 214 shown in FIG. 3. In the next step, the control process returns to the address at which the timer interrupt is generated.

As above described, the present invention includes a high pass filter for detecting line voltage in any two phases of the three phase AC and a microprocessor for comparing the strength of the line voltage whereby it can control the operation frequency of the compressor.

Therefore, the apparatus according to the present invention can suppress low order harmonic frequency, so that it has the advantage in that noise and vibrations are prevented.

What is claimed is:

1. An air conditioning apparatus including a rectifier and an inverter in an outdoor device for controlling the speed of a compressor by controlling the frequency of a three phase AC outputted from the inverter, said air conditioning apparatus comprising:

high pass filter, connected to two phases of the three phase AC outputted from the inverter, for detecting low order harmonic frequencies of the two phases as a line voltage;

amplifier for amplifying said line voltage output from the high pass filter and outputting said amplified line voltage; and a controller which receives said amplified line voltage for determining whether the line voltage is below a first set value, between the first set value and a second set value or above the second set value, said controller operating the compressor in a previous operation state if the line voltage is below the first set value, operating the compressor in an operation state which is one step lower than the previous speed if the line voltage is between the first set value and the second set value, or operating the compressor in a lowest operation state if the line voltage is above the second set value.

2. A method for controlling the operation frequency of a compressor in an air conditioning apparatus, comprising the steps of:

a) allowing an interrupt;

b) receiving operation data in a predetermined period and performing a PID algorithm on the operation data to determine an operation frequency after allowing the interrupt;

c) operating the compressor according to the determined operation frequency;

d) receiving low order harmonic frequencies of two phases of a three phase AC applied to the compressor as a line voltage and determining whether the line voltage is below a first set value, between the first set value and a second set value or above the second set value; and e) operating the compressor in a previous operation state if the line voltage is below the first set value, operating the compressor in an operation state one step lower than the previous speed if the line voltage is between the first set value and the second set value, or operating the compressor in a lowest operation state if the line voltage is above the second set value.

3. An apparatus for controlling an operation frequency of a compressor comprising:

means for detecting low order harmonic frequencies of two phases of a three phase output as a line voltage;

means for amplifying the detected line voltage of the two phases;

means for determining a state of the amplified line voltage of the two phases; and means for operating the compressor based on the state of the amplified line voltage.

4. An apparatus according to claim 3 wherein the amplified line voltage is in one of three states, below a first set value, between the first set value and a second set value or above the second set value.

5. An apparatus according to claim 4 wherein said operating means operates the compressor at a previous operating frequency if said amplified line voltage is below the first set value, at an operating frequency one step below the previous state if said amplified line voltage is between the first set value and the second set value, or at a lowest possible operating frequency if said amplified line voltage exceeds the second set value.

6. A method for controlling an operation frequency of a compressor comprising the steps of:

detecting low order harmonic frequencies of two phases of a three phase output as a line voltage;

amplifying the detected line voltage of the two phases;

determining a state of the amplified line voltage of the two phases; and operating the compressor based on the state of the amplified line voltage.

7. A method according to claim 6 wherein the amplified line voltage is in one of three states, below a first set value, between the first set value and a second set value or above the second set value.

8. A method according to claim 7 wherein said step of operating the compressor includes the steps of:

operating the compressor at a previous operating frequency if said amplified line voltage is below the first set value;

operating the compressor at a frequency one step below the previous state if said amplified line voltage is between the first set value and the second set value; and operating the compressor at a lowest possible operating frequency if said amplified line voltage exceeds the second set value.

* * * * *